United States Patent [19]

Stratton

[11] Patent Number: 4,707,741
[45] Date of Patent: Nov. 17, 1987

[54] VIDEO SIGNAL CLAMPING WITH CLAMP PULSE WIDTH VARIATION WITH NOISE

[75] Inventor: Boyd L. Stratton, Woodside, Calif.

[73] Assignee: Harris Corporation, Melbourne, Fla.

[21] Appl. No.: 850,955

[22] Filed: Apr. 11, 1986

[51] Int. Cl.$^4$ .................. H04N 5/18; H04N 5/213
[52] U.S. Cl. .................................. 358/171; 358/167; 358/172; 307/542
[58] Field of Search ............... 358/172, 171, 178, 160, 358/166, 167; 307/540, 542, 546, 552

[56] References Cited

U.S. PATENT DOCUMENTS 4,415,929 11/1983 Yoshisato ........................... 358/172
4,516,042 5/1985 Nakamura ........................... 358/172

*Primary Examiner*—Tommy P. Chin
*Attorney, Agent, or Firm*—Tarolli, Sundheim & Covell

[57] ABSTRACT

A video signal clamping arrangement is provided for periodically clamping a predetermined nonpicture portion of a video signal, having picture portion and predetermined nonpicture portions, to a desired reference level with a clamp time duration varying as a function of noise on the video signal. A noise detector is employed for providing a noise level signal representative of the average noise level on the video signal during a predetermined nonpicture portion thereof. A controllable switch is employed for purposes of completing a clamping circuit for clamping the video signal to a desired signal level. A clamp pulse timing circuit responds to the noise level signal for providing a switch control signal for controlling the switch on time duration as a function of the magnitude of the noise level signal.

15 Claims, 6 Drawing Figures

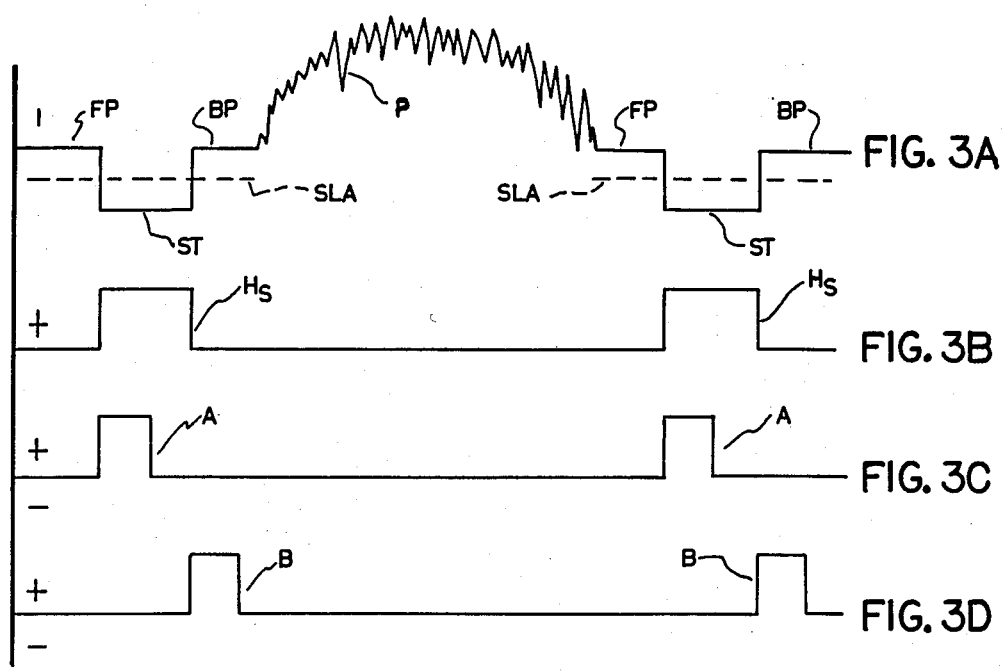
FIG. 3A
FIG. 3B
FIG. 3C
FIG. 3D
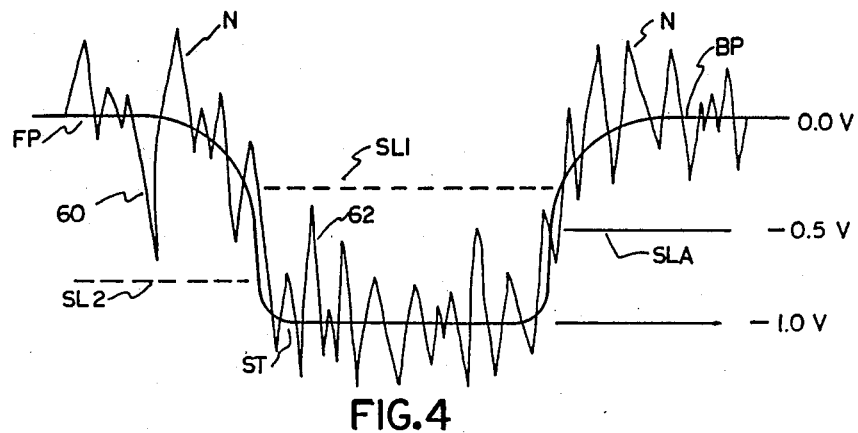
FIG. 4
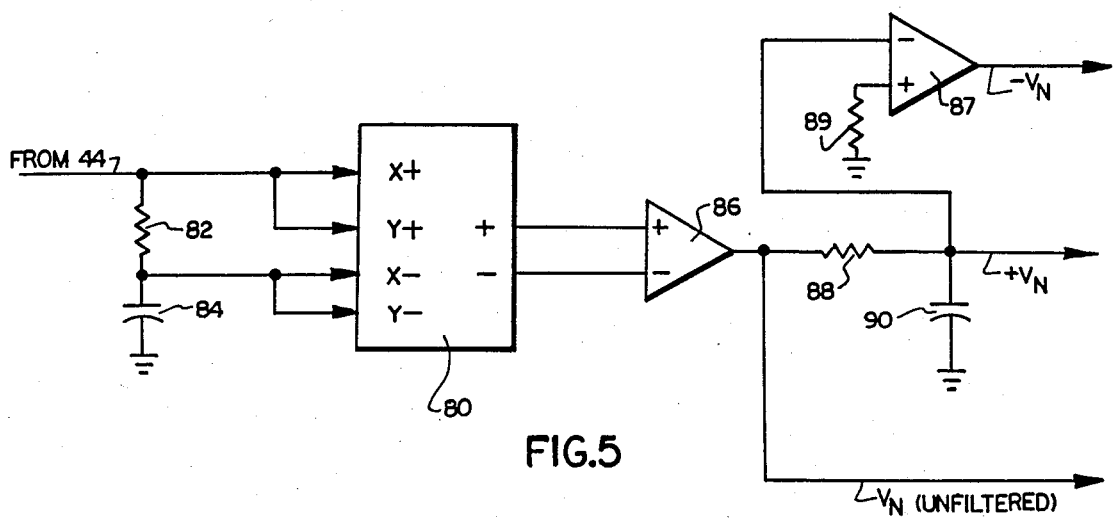
FIG. 5

VIDEO SIGNAL CLAMPING WITH CLAMP PULSE WIDTH VARIATION WITH NOISE

BACKGROUND OF THE INVENTION

This invention relates to the art of video signal processing and, more particularly, to clamping a nonpicture portion of a video signal to a desired reference level.

The invention has particular application to clamping the back porch portion of a video signal to a desired reference level and will be described with particular reference thereto; although, it is to be appreciated that the invention may be applied to other nonpicture portions of the video signal, such as the front porch and the sync tip.

Video signal clamping is a known technique employed in video signal processing. A typical video signal includes predetermined nonpicture portions as well as a picture portion. These predetermined nonpicture portions include the front porch, the sync tip and the back porch portions. These portions are intended to be at specific voltage levels with the front porch and back porch portions straddling the sync tip portion and being of essentially the same value. The sync tip portion is normally of a different value, usually negative with respect to the front porch and back porch portions. It is known that a typical video clamp circuit operates by identifying one of these nonpicture portions of the video signal which recurs and should be of a constant voltage or a known AC component superimposed on a constant voltage and then clamps this selected nonpicture portion from the video signal to a desired reference level.

If noise is present on a nonpicture portion of the video signal at the time clamping takes place, then objectionable picture streaking may take place. It is known in the art to employ circuitry for minimizing this picture streaking, caused by clamping to noise, and such a known technique takes the form as that illustrated and described in the U.S. Pat. No. to Nakamura, 4,516,042. Nakamura discloses a system in which a back porch sampler samples the back porch portion of the video signal and applies this to a variable time constant amplifier and supplies an offset voltage to a video amplifier which also receives the video signal so that the output of the video amplifier is driven toward the desired voltage level. A noise detection circuit responds to the noise present on the back porch portion sample and develops a control signal to vary the time constant of the variable time constant amplifier.

It is conventional to employ a video clamp circuit which includes a resistor and a capacitor in series circuit with a switching means to a reference level. The switch is periodically closed for a fixed period of time during a predetermined nonpicture portion of the video signal so as to clamp the video signal to the reference level by way of the RC circuit. Nakamura, supra, employs this concept but varies the time constant of the RC circuit as a function of measured noise. The switch closure time is not changed.

The present invention is directed toward a similar circuit employing an RC series circuit for clamping an input video signal to a desired reference level by way of a switch each time the switch is closed. However, contary to Nakamura, the present invention varies the switch closure time, and not the RC time constant, as a function of measured noise.

SUMMARY OF THE INVENTION

It is, therefore, a primary object of the present invention to provide an improved clamping circuit for clamping a video signal to a desired level during a predetermined nonpicture portion of the video signal, the clamp time duration being varied as a function of measured noise. It is a still further object of the present invention to provide such a clamping circuit for clamping the back porch portion of such a video signal to a desired signal level with the clamp time being varied as a function of noise measured during a predetermined nonpicture portion of the video signal.

It is a still further object of the present invention to provide such a clamping circuit wherein the measured noise is determined from a different nonpicture portion of the video signal, such as during the sync tip portion.

In accordance with the present invention, a video signal clamping apparatus is provided for periodically clamping a predetermined nonpicture portion of a video signal to a desired reference level with the clamping time duration varying as a function of noise on the video signal. This apparatus includes noise detector means responsive to the video signal during a predetermined nonpicture portion of the video signal for providing a noise level signal having a magnitude representative of the average noise level on the video signal. A clamping circuit includes a controllable switching means which when actuated to its closed or on condition, completes an RC clamping circuit for clamping the video signal to a desired reference level. A clamp pulse timing circuit responds to the noise level signal for providing a switch control signal for controlling the switch on duration as a function of the noise level signal.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein:

FIGS. 3A-3D are waveforms useful in describing the operation herein;

FIG. 4 is a waveform relating to the operation of the sync detector;

FIG. 5 illustrates the noise detector in greater detail than that illustrated in FIG. 2.

DESCRIPTION OF PREFERRED EMBODIMENT

Figure 1:
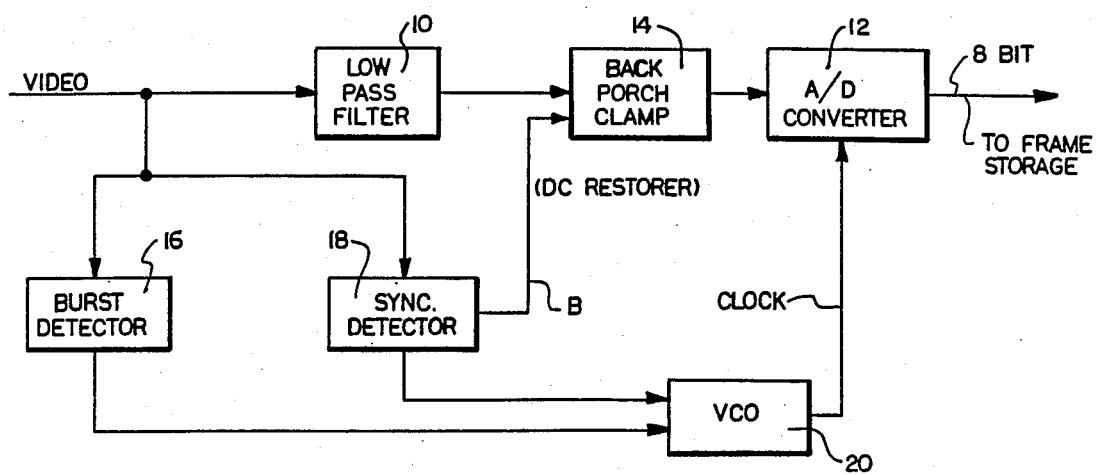
FIG. 1 is a schematic-block diagram illustration of a portion of a frame synchronizer employing the present invention.

Reference is now made to the drawings for purposes of presenting a preferred embodiment of the invention only and not for purposes of limiting same. Reference is now made to FIG. 1 which illustrates a portion of an input processor circuit of a frame synchronizer for processing the signals. The composite video signal is passed by a low pass filter 10, which in this example may be considered as passing signals up to a frequency of 5.5 MHz. This is within the range of operation of an analog-to-digital converter 12 which converts the analog video signal into a train of 8 bit digital samples which may be supplied to a frame storage for subsequent use. Prior to the video signal being applied to the analog-to-digial converter 12, it is passed through a back porch clamp circuit 14 to clamp a predetermined nonpicture portion to a desired level. Sometimes a back porch clamp circuit is referred to as a DC restorer and both terms may be employed herein for the same circuit. In this application, a video signal is clamped to a DC level on the order of −2.0 volts in the back porch portion of the video signal. The intelligence or picture content portion of the video signal will then vary between −2 volts and 0 volts which is within the operating range of the analog-to-digital converter. In some applications, the video signal may be clamped to ground level or some other desired signal level. Additionally, the circuitry in FIG. 1 includes a burst detector 16, which may be of conventional design, and a sync detector 18, which is conventionally employed for supplying timing information to a voltage controlled oscillator 20 which, in turn, provides clock pulses to operate the analog-to-digital converter 12.

Figure 2:
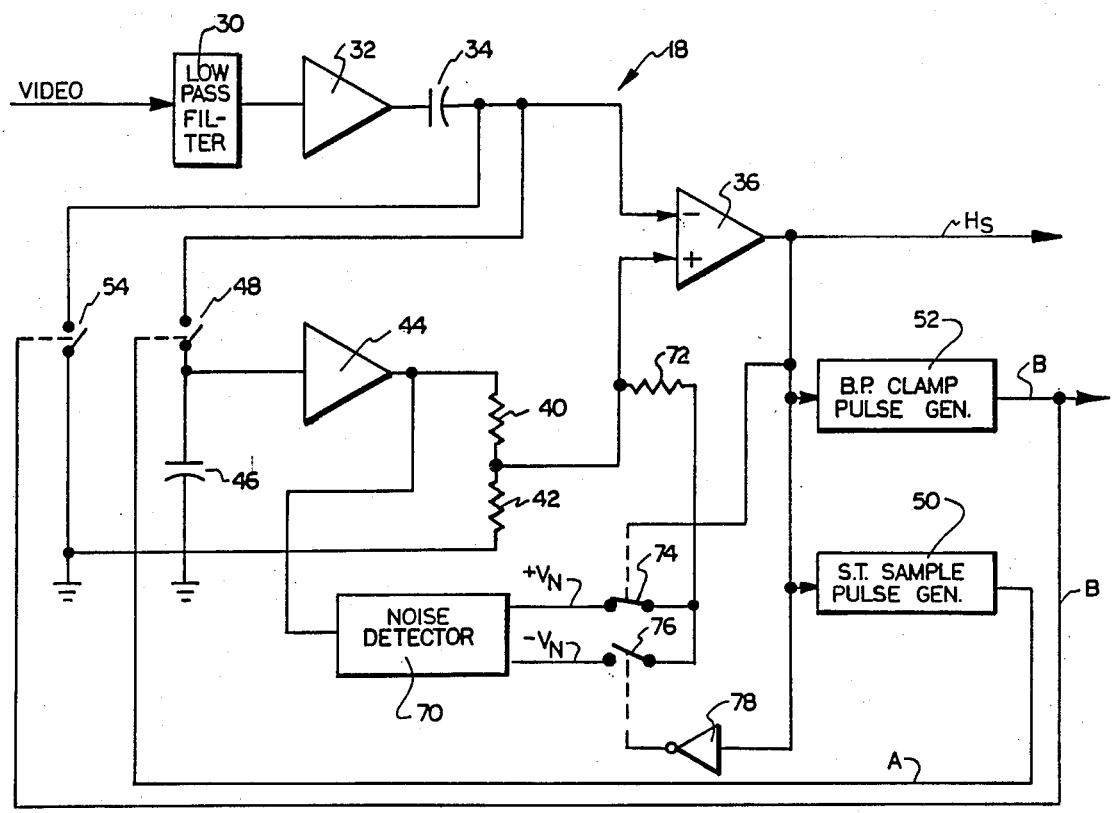
FIG. 2 is a schematic-block diagram illustration of the sync detector shown in the block diagram of FIG. 1.

Reference is now made to FIG. 2 which provides a more detailed illustration of the sync detector 18 in FIG. 1. The video signal is first passed through a low pass filter 30 which, for example, passes signals having a frequency up to 1.5 MHz. This, then, is a small portion of the frequency band of the video signal. The filtered video signal is then passed by a buffer 32 and a capacitor 34 to the negative input of a comparator 36 which operates as a sync slicer. This comparator 36 compares the filtered video signal with a threshold for the purposes of recovering the sync signal from the filtered video signal. This may be appreciated with reference to the waveforms in FIGS. 3A and 3B.

The waveform in FIG. 3A is representative of the composite video signal. As seen, the video signal has a picture portion P intermediate the front porch portion FP and a back porch portion BP. A horizontal sync signal separates the front porch portion from the back porch portion and this sync signal is referred to as the sync tip ST. Conventionally, the front porch portion and the back porch portion are at the same DC signal level, such as ground. The sync tip is also maintained at a constant level which is conventionally negative with respect to the front porch or back porch portions.

The sync slicer 36 compares a threshold signal with the filtered composite video signal in order to recover or detect the horizontal synchronizing signal and produce a horizontal sync signal $H_S$ in accordance therewith (see FIG. 3B). The threshold in FIG. 2 is obtained from the junction of a pair of resistors 40 and 42 connected between the output of a buffer 44 and ground. It should be noted that whereas ground potential is illustrated herein, a different reference level may be employed. The buffer 44 obtains its input from a charge stored on a capacitor 46, a sample and hold arrangement. This arrangement also includes a switch 48 which is periodically closed in synchronization with detection of the horizontal sync pulse to complete a path so that the filtered composite video signal may be sampled and stored in capacitor 46. The sampled voltage takes place during the sync tip portion ST of the video signal. The capacitor 46 charges toward this level and the charge of the capacitor is buffered through buffer 44 and applied across the voltage divider consisting of resistors 40 and 42 to provide a threshold level to the positive input of the sync slicer 36. Whenever the filtered video input signal becomes negative with respect to the threshold, the sync slicer 36 will output a positive pulse representing the horizontal sync signal $H_S$, as is seen in FIG. 3B. The leading edge of the horizontal sync signal triggers a sync tip sample pulse generator 50 to produce a sync tip control signal A (FIG. 3C) which is then employed for closing switch 48 during the sync tip portion ST of the filtered video signal. Similarly, the lagging edge of the horizontal sync signal $H_S$ triggers a back porch clamp pulse generator 52 to produce a trigger signal B (see FIG. 3D) which is employed to temporarily close a switch 54 so as to clamp the filtered video signal to ground during the back porch portion BP.

Referring again to FIGS. 2, 3A and 3B, it is recalled that the horizontal sync signal $H_S$ is produced when the fitered video signal has its DC level change to the point that it is more negative than the threshold supplied to the positive input of the sync slicer 36. The reference level or threshold may be called the slice level SLA. This is illustrated in FIG. 3A as being midway between that of the back porch portion BP and the sync tip portion ST. For example, if the back porch portion BP is at 0 volts and the sync tip portion ST is normally at −1.0 volts, then the threshold or slice level SLA may be set at −0.5 volts. Consequently, as the video signal becomes more negative than the threshold or slice level SLA, the output of comparator 36 will go positive and stay positive to provide the horizontal sync signal $H_S$ until the video sync signal once again increases positively toward the back porch level and becomes more positive than the threshold or slice level SLA. This is illustrated in FIGS. 3A and 3B. The discussion thus far assumes that there is no noise to contend with during the horizontal sync recovery.

Reference is now made to FIG. 4 which illustrates the video signal having noise and located on what was assumed to be constant level nonpicture portions, including the front porch FP, the sync tip ST, and the back porch BP, as well as the transitions between these levels. The noise includes peaks and valleys which may cross the normal slice level SLA at times which will create a false indication of a horizontal sync signal recovery. For example, a noise valley point 60 in FIG. 4 is clearly more negative than the slice level SLA and this would cause the sync slicer 36 to erroneously produce an indication of a horizontal sync signal. Similarly, a noise peak point 62 is clearly more positive than the slice level SLA and would cause the sync slicer 36 to erroneously provide an indication that the horizontal sync recovery has been completed. Consequently, noise such as that illustrated in FIG. 4 can provide erroneous horizontal sync recovery information.

In accordance with the embodiment illustrated in FIG. 2, the threshold or slice level is varied in the presence of noise from that of its low noise or normal threshold level SLA. For example with reference to FIG. 4, in the presence of noise, the negative going valley point 60 while being more negative than slice level SLA is not more negative than an offset slice level SL2. However, as the video signal becomes more negative than the offset slice level SL2, the comparator 36 will provide a positive horizontal sync signal. Similarly, whereas the noise peak 62 is more positive than the low noise or normal slice level SLA, it is not more positive than the modified or offset slice level SL1. However, as the video signal becomes more positive, it will exceed that of the offset slice level SL1, causing a termination of the horizontal sync signal. This operation is achieved by employing a noise detector generating information to modify the slice level during noisy conditions as measured during one of the predetermined nonpicture portions of the video signal.

In the embodiment of FIG. 2, the noise level is measured by a noise detector 70, to be described in greater detail hereinafter, which measures noise during the sync tip sample periods and provides an output indication representative of the average noise. This includes a positive signal $+V_N$, as well as a negative signal $-V_N$ to be added or subtracted to the normal slice level SLA so as to vary the slice level in accordance with measured noise. Both of these offset adjustments are supplied to the positive input of the sync slicer 36 by way of a resistor 72 which scales the offset signal. These offset signals are supplied by way of switches 74 and 76 which operate such that when one of the switches is closed, the other is open. The switch control is obtained from the comparator 36 such that when the output of the amplifier is positive (during a sync tip interval), the switch 74 is closed, as is shown in FIG. 2, so that the slice level is raised to that of slice level SL1. When the output of the comparator 36 is at ground potential (during the front porch or back porch portions) the switch 74 is open and switch 76 becomes closed by way of an inverter 78. It is to be appreciated that whereas switches 74 and 76 are illustrated as simple mechanical switches, they, in practice, would normally take the form of solid state switches operated in a well known manner. The noise detector 70 is discussed in greater detail with reference to FIG. 5.

Reference is now made to FIG. 5 which illustrates the noise detector in greater detail. This detector may be considered as an analog multiplier filtered at its input and its output. The analog multiplier 80 may conventionally take the form of an analog multiplier provided by Motorola Corporation and known as their Model MC1495. The input to multiplier 80 is taken from the output of buffer 44 (FIG. 2) and is supplied to unfiltered X+ and Y+ inputs of the multiplier. The signal from buffer 44 is also applied through a resistor 82 and a capacitor 84 to ground. The junction of resistor 82 and capacitor 84 supplies a filtered second input to the X− and Y− inputs of the multiplier 80. The multiplier effectively multiplies the difference between the inputs applied to the X+ and X− terminals by the difference between the inputs applied to the Y+ and Y− inputs. The outputs taken from the positive and negative output terminals of the multiplier 80 provide a balanced output and this is supplied to an operational amplifier 86 with its output being supplied to a filter including resistor 88 and a capacitor 90 taken to ground. The signal across resistor 82 represents fluctuations of the input signal at 44 caused by noise. This signal is multiplied by itself by multiplier 80 to give an absolute representation of noise at the output of amplifier 86. This, then, provides an output $+V_N$ which represents the average noise over several lines of video information. A negative output $-V_N$ may be obtained with an inverter amplifier 87 having its positive input connected to ground through a resistor 89.

Figure 6:
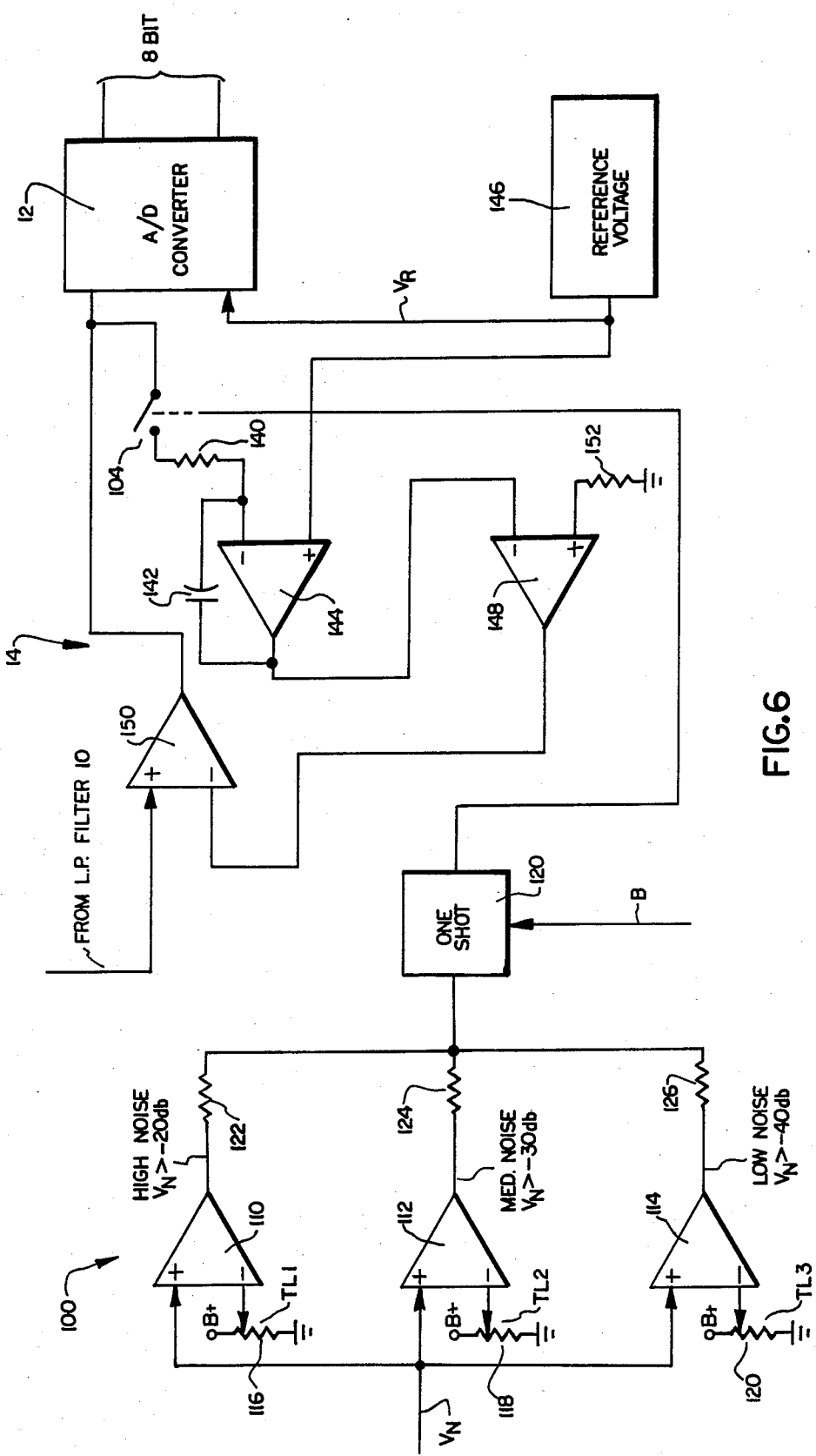
FIG. 6 is a schematic-block diagram illustrating the back porch clamp control circuitry herein.

Reference is now made to FIG. 6 which illustrates the back porch clamp 14 in greater detail. The back porch clamp 14 includes a clamp pulse timing network shown generally as network 100 and which includes a one shot circuit 102 that produces a switch turn on signal for closing a clamp switch 104 for a time duration that is inversely proportional to the average noise $V_N$ over several video lines. The one shot circuit 102 is triggered by the leading edge of trigger pulse B provided by the back porch clamp pulse generator 52 (FIG. 2). The time duration of the pulse varies inversely with the level of the noise $V_N$. This is achieved by supplying the noise signal $V_N$ to three comparators including a high noise comparator 110, a medium noise comparator 112 and a low noise comparator 114. The high noise comparator compares the noise signal $V_N$ with a threshold level TL1, as set by a potentiometer 116 or the like. The threshold is set such that a positive output voltage is supplied by comparator 110 whenever the noise level is sufficiently high that $V_N$ is indicative of noise greater than $-20$ db. Similarly, comparator 112 compares the noise signal $V_N$ with a threshold TL2 provided by a potentiometer 118 or like and provides a positive output voltage so long as the noise level is representative of medium noise wherein $V_N$ is greater than $-30$ db. Also, comparator 114 compares the noise signal $V_N$ with a threshold TL3 set by a potentiometer 120 or the like and provides a positive output voltage representative of low noise so long as the noise signal $V_N$ is greater than $-40$ db. One or more of these comparators 110, 112 and 114 may provide a positive output signal so long as the threshold of that comparator is being exceeded by the noise signal $V_N$. The outputs of these comparators are supplied by way of resistors 122, 124 and 126 to a common junction point which is connected to the one shot circuit 102. Once the one shot circuit 102 has been triggered by the trigger pulse B, it will provide an output which will remain on for a period which is inversely related to the magnitude of the noise signal $V_N$. This controls the time duration that switch 104 is closed.

The back porch clamping circuit 14 in FIG. 6 operates on the composite video to clamp the back porch portion of the composite video to a desired level. In this instance, it is clamped to a reference voltage $V_R$ which may be on the order of $-2.0$ volts. This is the same reference voltage that is supplied to the analog-to-digital converter 12 which operates in its conversion process between $-2.0$ volts and ground level. Consequently, then, by clamping the back porch level to this reference level, the picture content may take place between $-2.0$ volts and ground voltage for conversion by the analog-to-digital converter 12 into 8 bit digital words. A fixed RC time constant circuit is employed for the clamping operation and this includes resistor 140 and capacitor 142 connected in series with the switch 104. The capacitor is connected between the negative input and the output of an operational amplifier 144 having its positive input connected to a source 146 for the reference voltage $V_R$. An operational amplifier 148 following amplifier 144 serves as an inverter and has its output connected to the negative input of a driver amplifier 150. The positive input of amplifier 148 is connected to ground by way of a resistor 152.

The composite video signal, as passed by the low pass filter 10 (FIG. 1), is supplied to the positive input of the driver amplifier 150 and thence to the analog-to-digital converter 12. Each time switch 104 is closed during a back porch portion, capacitor 142 charges toward the level of the reference voltage $V_R$ so as to attempt to maintain the DC level of the back porch portion equal to that of the reference voltage $V_R$. However, the time duration that switch 104 is closed varies inversely with the noise level voltage $V_N$. In this manner, during noisy periods, the clamp on time is short, whereas during low noise periods, the clamp on time, i.e., the switch closure time, is long. When the output voltage of amplifier 150 is more positive than that of the reference voltage $V_R$, this will cause the output of amplifier 144 to go more negative, which will cause the output of amplifier 148 to go more positive. This, in turn, will cause the output of the amplifier 150 to go more negative toward that of reference voltage $V_R$.

Although the invention has been described with respect to a preferred embodiment, it is to be appreciated that various modifications may be made without departing from the spirit and scope of the invention as defined by the appended claims.

I claim:

1. A video signal clamping apparatus for periodically clamping a predetermined nonpicture portion of a video signal having a picture portion and said predetermined nonpicture portion to a desired reference level with the clamping time duration varying as a function of noise on said video signal, comprising:
   noise detector means responsive to said video signal during said predetermined nonpicture portion of said video signal for providing a noise level signal having a value representative of the average noise level on said video signal;
   clamping circuit means including actuatable switching means, having an on condition and an off condition, for, when on, completing a clamping circuit for clamping said video signal to said desired reference level; and
   clamp pulse timing means responsive to said noise level signal for providing a switch turn on signal for actuating said switch to its on condition for a time duration as a function of the value of said noise level signal.

2. Apparatus as set forth in claim 1 including reference means for providing a reference potential representative of said desired reference level.

3. Apparatus as set forth in claim 1 wherein said clamping circuit includes a resistor and a capacitor connected together in series and having a fixed RC time constant.

4. Apparatus as set forth in claim 3 wherein said clamp pulse timing means includes means for providing said switch turn on signal during said predetermined nonpicture portion of said video signal for actuating said actuatable switching means to its on condition.

5. Apparatus as set forth in claim 4 wherein said clamp pulse timing means includes means for controlling the time duration of said switch turn on signal for a period which is inversely related to the magnitude of said noise level signal.

6. Apparatus as set forth in claim 5 including a plurality of comparators each for comparing the magnitude of said noise level signal with a noise reference level and providing a noise control signal in accordance therewith for purposes of controlling the time duration of said switch turn on signal.

7. Apparatus as set forth in claim 6 wherein said video signal has at least first and second nonpicture portions, said noise detector means being responsive during said first nonpicture portion for providing said noise level signal and said clamp pulse timing means being responsive to said noise level signal for providing said switch turn on signal during said second nonpicture portion.

8. Apparatus as set forth in claim 7 wherein said first nonpicture portion is the sync tip portion and said second nonpicture portion is the back porch portion of said video signal.

9. Apparatus as set forth in claim 1 including video amplifier means having a first input for receiving said video signal and an output for providing an output video signal to be clamped to said desired reference level.

10. Apparatus as set forth in claim 9 wherein said video amplifier means has a second input for receiving an offset signal for use in driving said video amplifier means such that the output video signal approaches the level of said desired reference level during said predetermined nonpicture portion.

11. Apparatus as set forth in claim 10 wherein said clamping circuit means includes means for providing said offset signal to the second input of said video amplifier means for driving said output signal toward the level of said desired signal level.

12. Apparatus as set forth in claim 11 wherein said clamping circuit means includes a resistor and a capacitor connected in series with said switching means and having a fixed RC time constant.

13. Apparatus as set forth in claim 12 wherein said switching means connects the output of said video amplifier means in series circuit with said resistor and said capacitor.

14. Apparatus as set forth in claim 13 wherein said means for providing said offset signal includes an offset amplifier means having an input for receiving said video output signal by way of said switching means and said resistor and an output connected to the input thereof by way of said capacitor to provide said offset signal, and a second input connected to a reference voltage source for providing said desired reference level.

15. Apparatus as set forth in claim 14 wherein the output of said offset amplifier means is coupled to the second input of said video amplifier means for driving the output video signal to said desired reference level corresponding with that of said reference voltage source.

* * * * *